(12) United States Patent
Qian et al.

(10) Patent No.: US 11,460,245 B2
(45) Date of Patent: Oct. 4, 2022

(54) METHOD OF NATURAL GAS PRETREATMENT

(71) Applicant: L'Air Liquide, Société Anonyme pour l'Etude et l'Exploitation des Procédés Georges Claude, Paris (FR)

(72) Inventors: Yufeng Qian, Houston, TX (US); Jasmin Junger, Karlsruhe (DE); Elise Renou, Champigny sur Marne (FR); Alexander Roesch, Butzbach (DE)

(73) Assignee: L'Air Liquide, Scoiété Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 204 days.

(21) Appl. No.: 17/012,109

(22) Filed: Sep. 4, 2020

(65) Prior Publication Data

US 2022/0074655 A1 Mar. 10, 2022

(51) Int. Cl.
*F25J 3/02* (2006.01)
*B01D 53/26* (2006.01)
*C01B 3/36* (2006.01)
*B01D 53/04* (2006.01)

(52) U.S. Cl.
CPC ........ *F25J 3/0209* (2013.01); *B01D 53/0462* (2013.01); *B01D 53/261* (2013.01); *C01B 3/36* (2013.01); *F25J 3/0257* (2013.01); *F25J 3/0266* (2013.01); *B01D 2253/102* (2013.01); *B01D 2253/104* (2013.01); *B01D 2253/116* (2013.01); *B01D 2253/1124* (2013.01); *B01D 2256/245* (2013.01); *B01D 2257/102* (2013.01); *B01D 2257/504* (2013.01); *B01D 2257/602* (2013.01); *B01D 2257/80* (2013.01); *B01D 2259/40086* (2013.01); *C01B 2203/0233* (2013.01); *C01B 2203/0238* (2013.01); *C01B 2203/0244* (2013.01); *C01B 2203/0255* (2013.01); *C01B 2203/1241* (2013.01); *C01B 2203/1258* (2013.01); *F25J 2220/60* (2013.01)

(58) Field of Classification Search
CPC .............. C01B 3/36; C01B 2203/0233; C01B 2203/0238; C01B 2203/0244; C01B 2203/0255; C01B 2203/1258; B01D 2256/245; B01D 2257/102; B01D 2257/504; B01D 2257/602; B01D 53/261; F25J 2220/60; F25J 3/0209
See application file for complete search history.

(56) References Cited

U.S. PATENT DOCUMENTS

2012/0085232 A1* 4/2012 Sethna ................. B01D 53/229
95/41

* cited by examiner

*Primary Examiner* — Jafar F Parsa
(74) *Attorney, Agent, or Firm* — Elwood L. Haynes

(57) ABSTRACT

A method of natural gas treatment including introducing a natural gas containing stream into a dryer unit, thereby producing a treated natural gas containing stream. Introducing the treated natural gas containing stream into a nitrogen rejection unit, thereby producing a further treated natural gas stream as a nitrogen rejection unit product. Splitting the nitrogen rejection unit product into at least two portions, introducing the first portion of the further treated natural gas stream into a reformer unit as first part of feed, and introducing a second portion of the further treated natural gas stream into the dryer unit as a regeneration stream, thereby producing a regeneration waste stream. Introducing at least a portion of the regeneration waste stream into the reformer unit as second part of feed.

12 Claims, 3 Drawing Sheets

METHOD OF NATURAL GAS PRETREATMENT

BACKGROUND

In a synthesis gas (syngas) generation unit, a syngas product which is primary comprised of hydrogen and carbon monoxide, is generated from natural gas by reforming. Such processes include, but are not limited to, steam methane reforming, partial oxidation reforming, dry reforming, auto thermal reforming or any combination of these. Whatever impurities that are in the feed streams (including natural gas and other feed stream such as CO2, O2, and/or steam), or an oxidized variant of these impurities, will necessarily be contained within the syngas stream. Thus, if the purity requirements for the syngas stream are very stringent, the hydrocarbon containing gas stream must be purified accordingly.

Typically, harmful impurities may include mercury, inorganic and organic sulfur compounds, nitrogen, and/or BTX (which is a blend of benzene, toluene and xylene isomers). Usually, mercury needs to be removed first, by either non-regenerative adsorption such as activated carbon or metal oxide absorbent. However, the removal of nitrogen, sulfur and BTX may be highly optimized, to fit into syngas generation unit overall process design. Typically, bulk sulphur is removed together with CO2 in unit 104 as amine unit, and remaining small amount of sulphur could be removed in downstream carbon dioxide removal unit 104.

Nitrogen removal may be done either upstream or downstream of reformer. If the allowed nitrogen impurity in the syngas product is low (such as <0.1% mol), then a nitrogen rejection unit (NRU) upstream of reformer is typically a better choice in terms of both capital expenditure (CAPEX) and operating expenditure (OPEX). Such an NRU may typically consist of one or several cryogenic distillation columns.

This further mandates that the inlet stream be treated first to avoid any components that may freeze inside cold box. For example, bulk CO2 may be removed by amine wash unit, or molecular sieve beds, depends on CO2 concentration in the feed hydrocarbon gas stream. The bulk of the water may be removed by cooling the gas stream and phase separating the resulting condensate, followed by dryer which uses some type of adsorbent such as activated alumina and molecular sieve.

Heavy hydrocarbons and BTX would also freeze in NRU cold box (CB) if the concentration is above a limit. One way to remove heavy hydrocarbons and BTX is by a complicated process inside CB, with including a series of partially cool down heat exchangers, and flash drums or distillation columns, which could potentially double the CAPEX of NRU.

One scheme known to the art may be found in FIG. 1. In this scheme, natural gas inlet stream 101 enters the system with unwanted impurities and enters mercury removal unit 102. As discussed above, mercury removal unit 102 may be an activated carbon unit or a metal oxide absorbent. Reduced mercury containing natural gas stream 103 then enters carbon dioxide removal unit 104. Reduced carbon dioxide containing natural gas stream 105 then enters dryer 106. As discussed above, dryer 106 may be activated alumina or molecular sieve or other adsorbents. Treated natural gas stream 107 then enters nitrogen rejection unit 108. As discussed above, nitrogen rejection unit 108 may consist of one or several cryogenic distillation columns. Treated natural gas stream 109 then enters reformer unit 110. As discussed above, reformer unit may be steam methane reforming, partial oxidation reforming, dry reforming, auto thermal reforming or any combination of these. Syngas stream 111 then exits the system, wherein it may be further purified or separated as desired.

Nitrogen rejection unit 108 also produces waste nitrogen stream 112. This gas is typically composed of a majority of nitrogen with the remaining being light hydrocarbons such as methane and is dry and well-suited to be used as regeneration gas. General speaking, a preferable regeneration gas should be free or in low concentration of any component which could freeze in NRU cold box, such as water, CO2, heavy hydrocarbon and BTX. Waste nitrogen stream 112 may be combined with makeup dry nitrogen stream 113, wherein the combined stream is then used to regenerate dryer 106 as needed. This reduces the usage of makeup regeneration gas such as dry nitrogen or dry natural gas and improves the overall economics of the syngas unit. Waste regeneration/purge gas stream 114 may then be used as fuel gas or simply flared.

Another scheme known to the art may be found in FIG. 2. In this scheme, natural gas inlet stream 101 enters the system with unwanted impurities and enters mercury removal unit 102. As discussed above, mercury removal unit 102 may be an activated carbon unit or a metal oxide absorbent. Reduced mercury containing natural gas stream 103 then enters carbon dioxide removal unit 104. Reduced carbon dioxide containing natural gas stream 105 then enters dryer 106. As discussed above, dryer 106 may be activated alumina or molecular sieve or other adsorbent. Treated natural gas stream 107 then enters nitrogen rejection unit 108. As discussed above, nitrogen rejection unit 108 may consist of one or several cryogenic distillation columns. Treated natural gas stream 109 then enters reformer unit 110. As discussed above, reformer unit may be steam methane reforming, partial oxidation reforming, dry reforming, auto thermal reforming or any combination of these. Syngas stream 111 then exits the system, wherein it may be further purified or separated as desired.

Natural gas regeneration stream 115 is a portion of dried natural gas stream 107. This stream could also be any suitable and available hydrocarbon stream such as fuel gas imported from plant battery limit. Natural gas regeneration stream 115 is then used to regenerate dryer 106 as needed. Waste regeneration/purge gas stream 114 may then be used as fuel gas or simply flared.

The present invention involves an efficient and economical BTX removal process suitable for NRU.

SUMMARY

A method of natural gas treatment including introducing a natural gas containing stream into a dryer unit, thereby producing a treated natural gas containing stream. Introducing the treated natural gas containing stream into a nitrogen rejection unit, thereby producing a further treated natural gas stream as a nitrogen rejection unit product. Splitting the nitrogen rejection unit product into at least two portions, introducing the first portion of the further treated natural gas stream into a reformer unit as first part of feed, and introducing a second portion of the further treated natural gas stream into the dryer unit as a regeneration stream, thereby producing a regeneration waste stream. Introducing at least a portion of the regeneration waste stream into the reformer unit as second part of feed.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
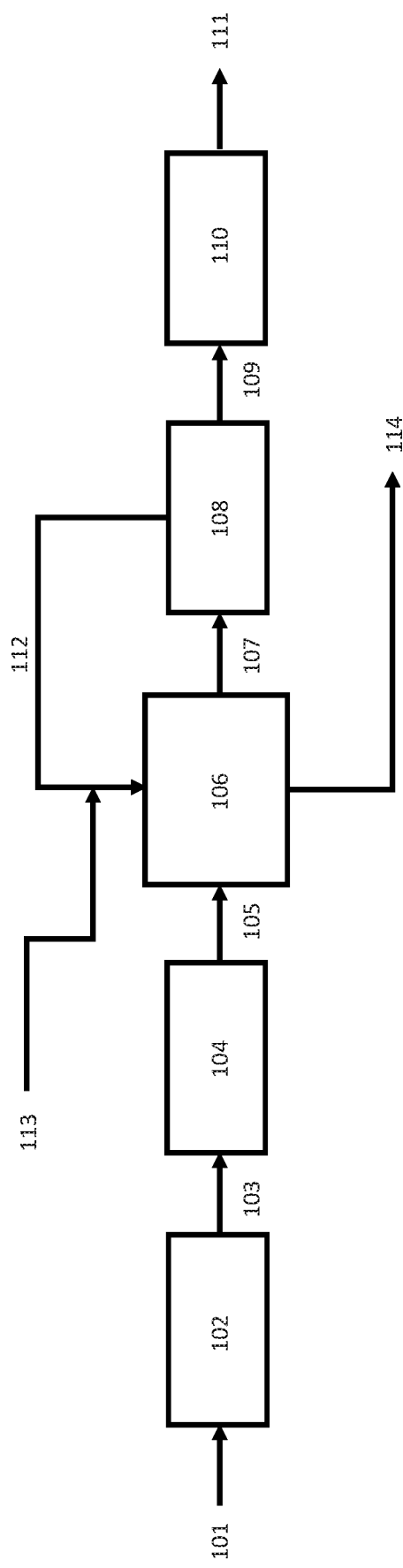
FIG. 1 is a schematic representation of a process scheme known to the art.
Figure 2:
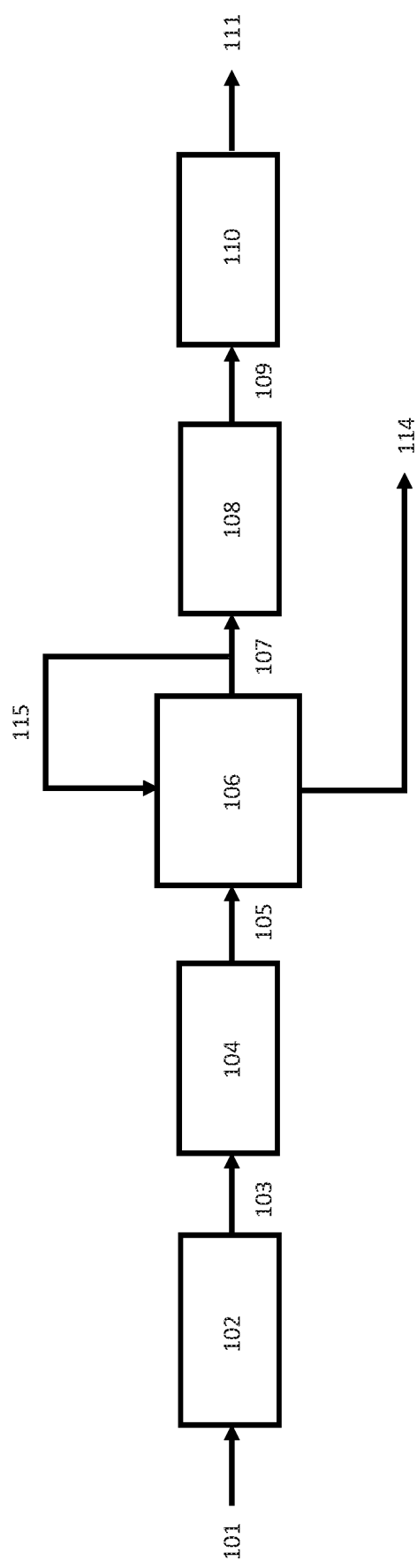
FIG. 2 is another schematic representation of a process scheme known to the art.

101=natural gas inlet stream
102=mercury removal unit
103=reduced mercury containing natural gas stream
104=carbon dioxide removal unit
105=reduced carbon dioxide containing natural gas stream
106=dryer
107=treated natural gas stream
108=nitrogen rejection unit
109=treated natural gas stream exiting the nitrogen rejection unit
110=reformer unit
111=syngas stream
112=waste nitrogen stream
113=makeup stream
114=waste regeneration/purge gas stream
115=natural gas regeneration stream
116=dry treated natural gas regeneration stream
117=regeneration/purge reformer feed stream

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein the term "temperature swing adsorption" is defined as a system in which the regeneration of the adsorbent is achieved by an increase in the temperature of the adsorbent. This increase in temperature is introduced by means of a hot purge gas stream that sweeps the desorbed components out of the system.

Figure 3:
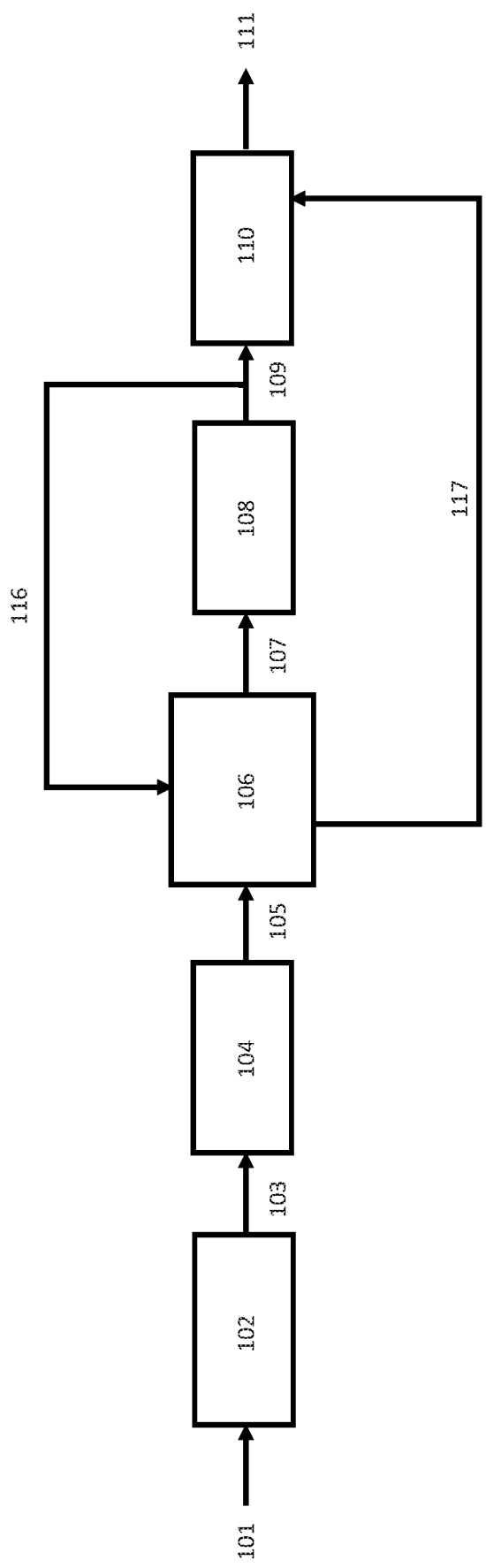
FIG. 3 is a schematic representation of a process scheme in accordance with one embodiment of the present invention.

One embodiment of the present invention may be found in FIG. 3. In this scheme, natural gas inlet stream 101 enters the system with unwanted impurities and enters mercury removal unit 102. As discussed above, mercury removal unit 102 may be an activated carbon unit or a metal oxide absorbent. Reduced mercury containing natural gas stream 103 then enters carbon dioxide removal unit 104. Reduced carbon dioxide containing natural gas stream 105 then enters dryer 106. As discussed above, dryer 106 may be activated alumina or molecular sieve or other adsorbents. Treated natural gas stream 107 then enters nitrogen rejection unit 108. As discussed above, nitrogen rejection unit 108 may consist of one or several cryogenic distillation columns Treated natural gas stream 109 then enters reformer unit 110. As discussed above, reformer unit may be steam methane reforming, partial oxidation reforming, dry reforming, auto thermal reforming or any combination of these. Syngas stream 111 then exits the system, wherein it may be further purified or separated as desired.

As mentioned above, dryer regeneration stream 116 is preferably to be free of, or in low concentration of, any component which could freeze in nitrogen rejection unit 108 cold box, such as water, $CO_2$, heavy hydrocarbon and BTX. The treated gas exiting nitrogen rejection unit 108 is suitable for this purpose. Furthermore, nitrogen rejection unit 108 could easily be designed to have treated natural gas stream 109 at a higher pressure compared to nitrogen rejection unit 108 inlet stream 107, with very little energy consumption penalty. This feature makes it possible to split and use part of nitrogen rejection unit 108 product stream 109 as dryer regen gas, and then combine the waste regen gas 117 with the remaining part of nitrogen rejection unit 108 outlet natural gas, to be the feed stream of reformer unit. In this design, dryer 106 is regenerated under high pressure and high temperature. Compared to a typical dryer regeneration, in which it is preferable to regenerate under low pressure and high temperature, this design is less efficient but still feasible, and fits the overall design better. Regeneration/purge reformer feed stream 117 is primarily contaminated with water, BTX and heavy hydrocarbons. Thus, regeneration/purge reformer stream 117 is ideal to be added to the feeds stream for a reformer unit, such as a POX, SMR, ATR, or combined reformer. Overall, this system requires the same or less amount of natural gas at the battery limits and does not increase the size of pre-treatment units such as unit 102 and 104.

In this scheme, an adsorbent may be used to simultaneously remove the majority of the water, heavy hydrocarbon and BTX in the hydrocarbon containing stream. In another embodiment, heavy hydrocarbon, BTX and the water may be removed in two separate beds in series, by the same or by different absorbents. This is desirable when the BTX and water contents are such that their removal may not be optimized into single removal bed. The regeneration of the adsorbent may be integrated with the NRU and syngas units for process optimization.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of natural gas treatment, comprising:
   introducing a natural gas containing stream into a dryer unit, thereby producing a treated natural gas containing stream, introducing the treated natural gas containing stream into a nitrogen rejection unit, thereby producing a further treated natural gas stream as a nitrogen rejection unit product, splitting the nitrogen rejection unit product into at least two portions, introducing the first portion of the further treated natural gas stream into a reformer unit as first part of feed, and introducing a second portion of the further treated natural gas stream into the dryer unit as a regeneration stream, thereby producing a regeneration waste stream, introducing at least a portion of the regeneration waste stream into the reformer unit as second part of feed.

2. The method of claim 1, wherein said dryer unit comprise a temperature swing adsorption unit.

3. The method of claim 1, wherein said nitrogen rejection unit comprises at least one cryogenic distillation column.

4. The method of claim 1, wherein the reformer unit is selected from the group consisting of a steam methane reformer, a partial oxidation reformer, a dry reformer, an autothermal reformer, or a combination of these.

5. The method of claim 1, wherein upstream of the dryer unit, the natural gas containing stream has been treated in a mercury removal unit.

6. The method of claim 1, wherein upstream of the dryer unit, the natural gas containing stream has been treated in a carbon dioxide removal unit.

7. A method of natural gas treatment, comprising introducing at least a portion of a natural gas stream that has been treated in a nitrogen rejection unit into a dryer unit as a regeneration stream, then introducing the resulting purge stream into a reformer as at least a portion of the fuel stream.

8. The method of claim 7, wherein said dryer unit comprise a temperature swing adsorption unit.

9. The method of claim 7, wherein said nitrogen rejection unit comprises at least one cryogenic distillation column.

10. The method of claim 7, wherein the reformer unit is selected from the group consisting of a steam methane reformer, a partial oxidation reformer, a dry reformer, an autothermal reformer, or a combination of these.

11. The method of claim 7, wherein upstream of the dryer unit, the natural gas containing stream has been treated in a mercury removal unit.

12. The method of claim 7, wherein upstream of the dryer unit, the natural gas containing stream has been treated in a carbon dioxide removal unit.

* * * * *